May 3, 1955 C. B. HARKER 2,707,360
MECHANISM FOR FORMING ARTICLES FROM STRIP MATERIAL
Filed April 5, 1954 9 Sheets-Sheet 2

INVENTOR
Charles B. Harker
By Carlson, Pitzner Hulbard o Wolfe
ATTORNEY

United States Patent Office 2,707,360
Patented May 3, 1955

2,707,360

MECHANISM FOR FORMING ARTICLES FROM STRIP MATERIAL

Charles B. Harker, Rockford, Ill., assignor to Bartelt Engineering Company, Rockford, Ill., a corporation of Illinois Application April 5, 1954, Serial No. 421,145

22 Claims. (Cl. 53—62)

This invention relates to a mechanism for converting flexible strip material into packaging articles and particularly to a mechanism for converting the strips or tapes into handles for bags such as are used to package tea and the like. More especially, the invention has reference to a mechanism for forming the handle from two tapes which are disposed face to face with their ends straddling one edge portion of the bag so that the end portions of the tapes may be joined to opposite sides of the bag while the remaining portions of the tapes are joined together. Preferably, the tapes are joined together and to the bag by heat seals formed by the application of heat and pressure.

The general object of the invention is to provide a new and improved mechanism of the above character in which the strips are advanced along a predetermined path, guided along this path and joined together in a novel manner to permit the operations to be performed on high speed automatic machinery while accurately converting the strips into neat articles.

A more detailed object is to advance the strips to the position in which they are joined through a hollow guide which is shifted laterally after the advance to expose the strips and permit the latter to be joined together.

Another object is to advance the strips through a guideway in the guide in such a manner as to expose one edge portion of each strip so that the strips may be advanced by a feeding device engaging these edge portions.

A further object is to advance the strips by means of travelling grippers which engage the exposed edge portions of the strips and move alongside the path of advance of the strips.

Another object is to provide a novel means for holding the strips in the position to be joined together while the guide is being shifted and during the joining operation.

Still another object is to provide a novel means for guiding the strips into the guide so that the strips enter the guideway and are advanced properly.

The invention also resides in the particular correlation of elements to adapt the mechanism for making a handle and adding the handle to a bag.

Other objects and advantages of the invention will become apparent from the following detailed description taken in connection with the accompanying drawings, in which.

While the invention may be employed to convert strip material into various articles such as bags, envelopes and the like, it is shown herein for purposes of illustration as embodied in a mechanism for adding a handle 20 (Fig. 2) to a generally flat bag 21 composed of front and back panels whose margins are joined together to close the bag. Preferably, the bottom edges of the panels are joined by a fold while heat seals 22 join the side margins and a heat seal 23 closes the top of the bag. A bag of this type may be used as a tea bag in which case the panels are made of a porous paper coated on the inside with a heat sealable material for forming the seals 22 and 23.

Figure 1:
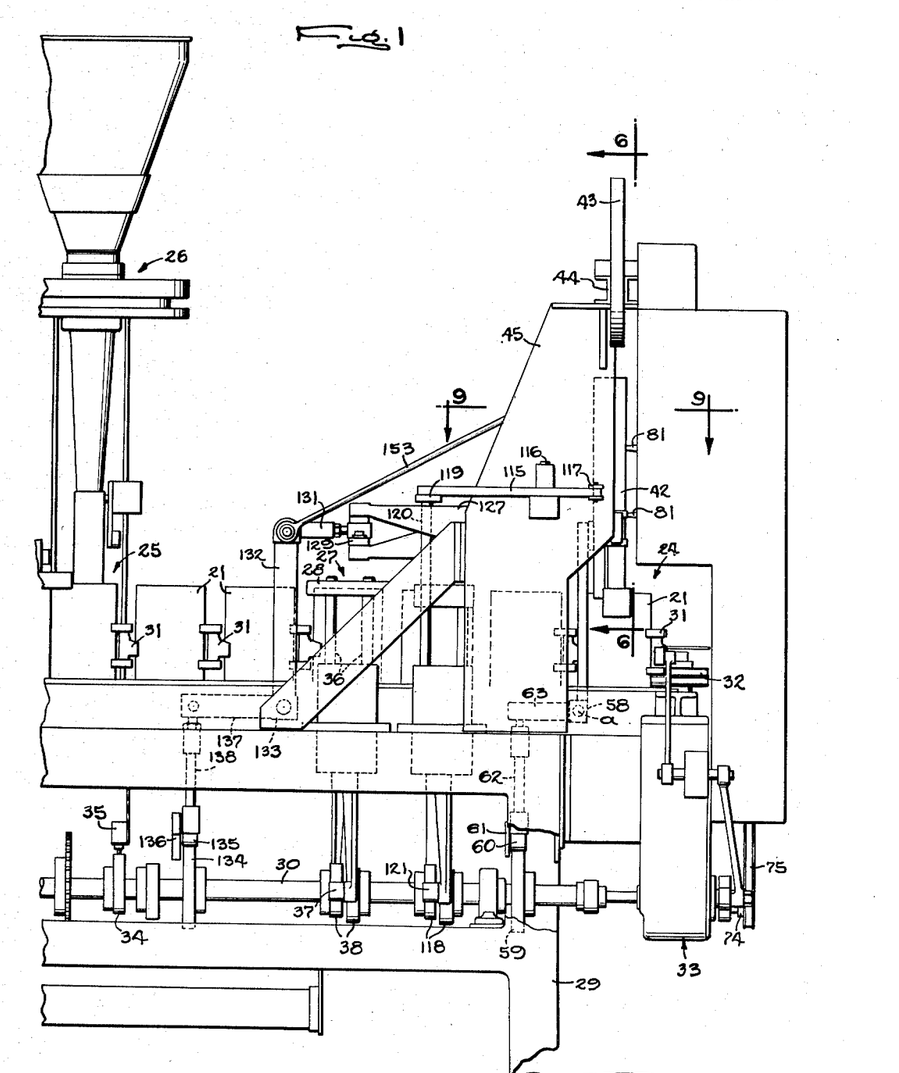
Figure 1 is a fragmentary side elevation of a packaging machine embodying the novel strip converting mechanism of the present invention.

The mechanism for adding the handle 20 may, as illustrated in Fig. 1, be disposed at the last station 24 of an automatic packaging machine in which bags open at the upper end are presented first to a station 25 where a filling device 26 deposits a charge of the material to be packaged, such as tea, in the bag and then to a closing station 27 where pivoted pressure bars 28 swing together and engage the upper margins of the bag panels to form the seal 23 closing the mouth of the bag. The bars 28 are heated to fuse the heat sealable material on the upper margins of the panels and form the top seal.

Figure 12:
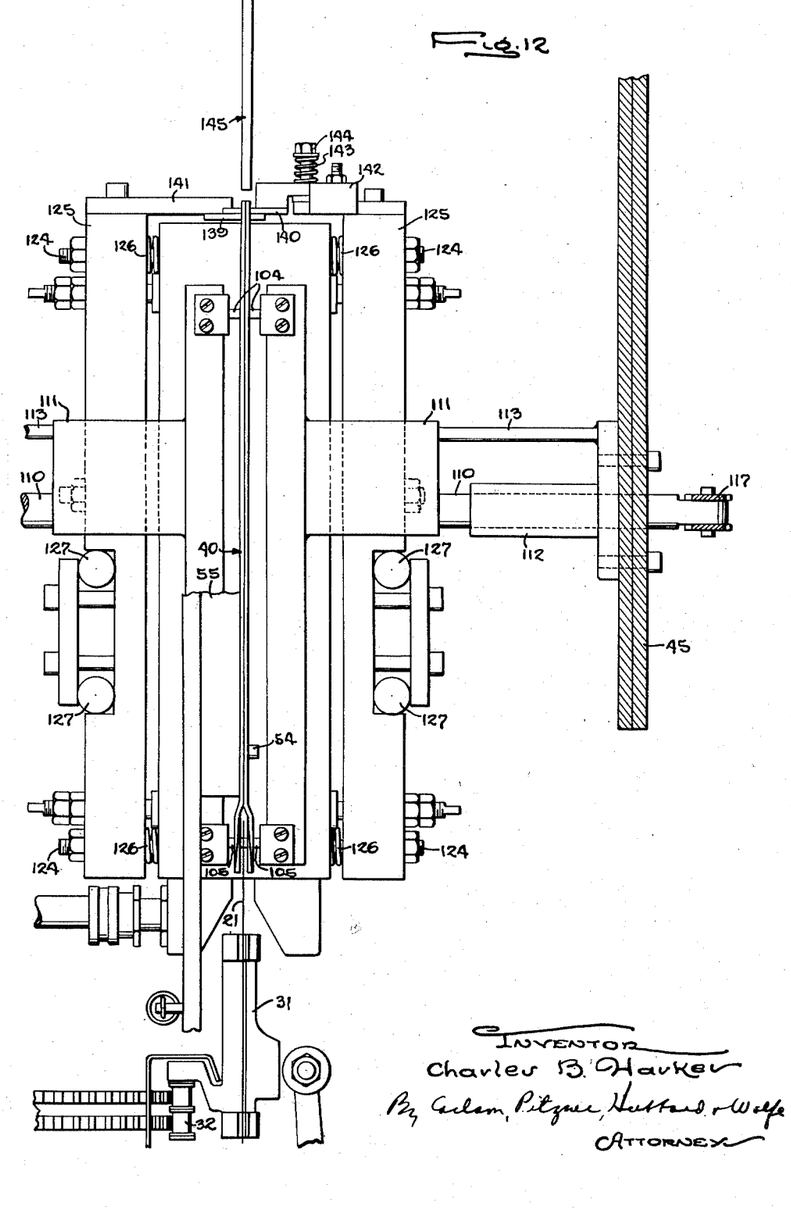
Fig. 12 is a fragmentary sectional view taken along the line 12—12 in Fig. 9.

The various mechanisms for filling and closing the bags 21, for adding the handle 20 and for advancing the bags from station to station are mounted on an elongated horizontal frame 29 and each is actuated in timed relation with the others from a continuously driven horizontal camshaft 30 journaled on the frame. A plurality of spaced clamps 31 grip the leading edges of the bags and are mounted on an endless chain 32 (Figs. 1 and 12) which is driven intermittently from the camshaft through a Geneva mechanism 33 to advance the bags step by step from one station to the next. While a bag dwells at the station 25, a cam 34 on the camshaft closes a switch 35 to actuate the filler 26 which dispenses the material being packaged into the bag through the open upper end thereof.

After being filled, the bag is advanced three steps to the closing station 27. The sealing shoes 28 at this station are mounted on the upper ends of vertical levers 36 which are pivotally supported intermediate their ends on the frame 29. Followers 37 on the lower ends of the levers engage cams 38 on the shaft 30 and, during dwelling of the bag at the filling station, these cams swing the levers together to press the shoes 28 against the opposite sides of the upper margins of the bag panels and seal the bag closed. The bag then is advanced three steps to the station 24 where the handle 20 is formed and attached to the bag.

Figures 2, 3, 4, 5:
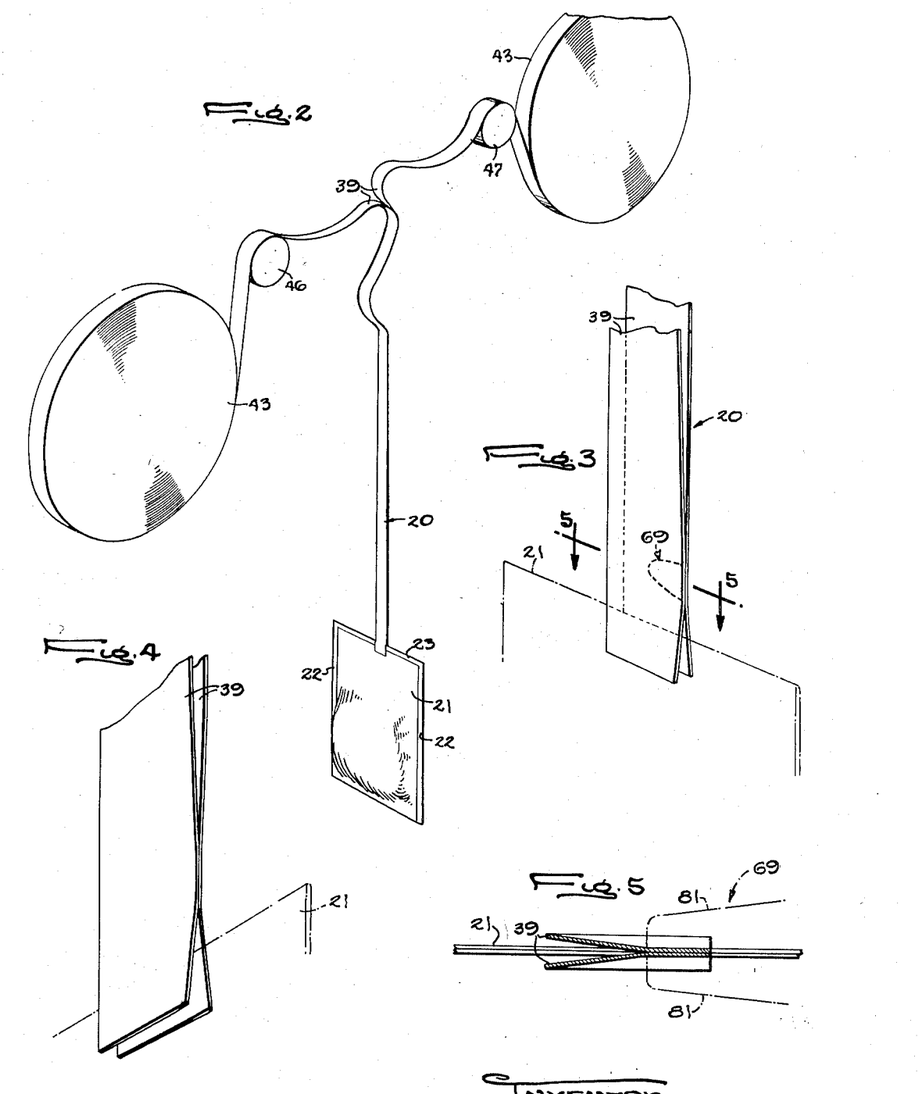
Fig. 2 is a schematic perspective view illustrating the manner in which the strips are converted into a handle for a bag.
Fig. 3 is an enlarged schematic perspective view showing the manner in which the strips are advanced preparatory to the sealing.
Fig. 4 is an enlarged schematic perspective view showing the strips in position for sealing.
Fig. 5 is a fragmentary sectional view taken along the line 5—5 in Fig. 3.

As shown in Figs. 2, 3 and 4, the handle 20 is composed of two narrow strips 39 of flexible tape which are disposed face to face and extend outwardly from the upper edge of the bag 21. At their lower ends, the tapes straddle the seal 23 at the upper edge portion of the bag. Preferably, the tapes are made of or coated on their opposing sides with a heat sealable material and heat and pressure sufficient to soften the heat sealable material are applied to the tapes throughout their entire length so that, above the bag, the tapes are joined together while the lower end portions of the tape are sealed to the upper margins of the bag panels.

Figure 6:
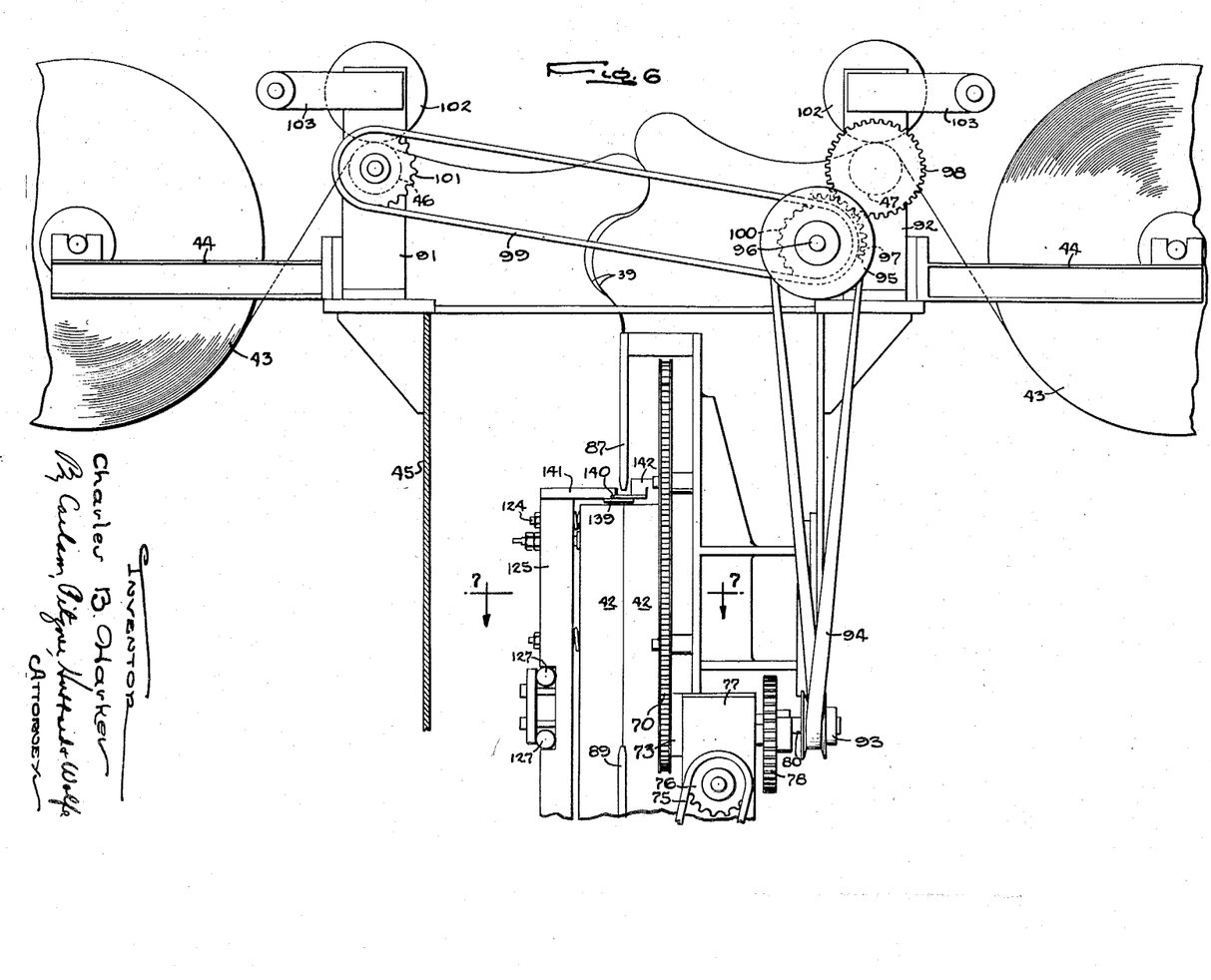
Fig. 6 is an enlarged fragmentary sectional view taken along the line 6—6 in Fig. 1.
Figure 7:
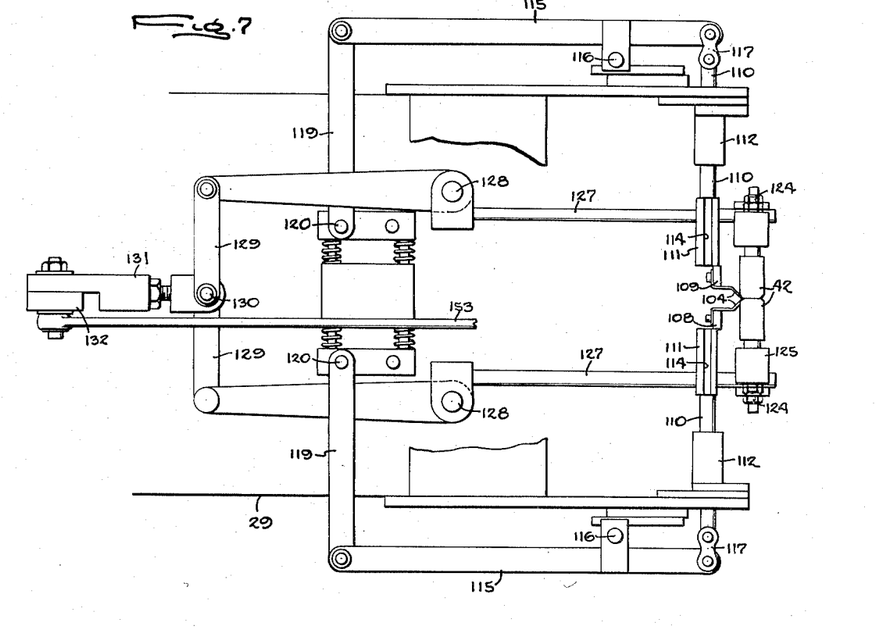
Fig. 7 is an enlarged fragmentary sectional view taken along the line 7—7 in Fig. 6.

The present invention contemplates the provision of a novel mechanism for guiding the tapes 39 into the proper position relative to the bag 21 and for joining the tapes to each other and to the bag while the latter is dwelling at the station 24. This mechanism includes a hollow upright guide 40 (Figs. 10, 13 and 15) through which the tapes are drawn by a feeding device 41. When the latter has advanced the tapes into the position in which the tape ends straddle the upper edge of the bag, the guide is shifted laterally exposing the tapes (Fig. 11) and sealing elements 42 (Figs. 7 and 12) normally disposed on opposite sides of the guide are moved together to engage the tapes causing them to be joined together and to the bag. Herein, the tapes are unwound from two separate supply rolls 43 journaled respectively on two horizontal arms 44 (Fig. 6) projecting laterally in opposite directions from the top of a casing 45. The latter is secured to the top of the frame 29 at the station 24 and encloses the mechanism for forming and attaching the tape. As shown in Fig. 2, the tapes after being unwound from the supply rolls are led respectively over rollers 46 and 47 and then are guided down into the guide 40.

The guide 40 defines an elongated vertical guideway which, in the present instance, is composed of two parallel channels 48 (Figs. 15, 17, 18 and 19) forming separate paths for the two tapes 39. These channels extend throughout the full length of the guide and open laterally outwardly toward the rear end of the machine, that is, to the right as viewed in Figs. 1 and 13, to permit the guide to be shifted to the left preparatory to sealing of the tapes. The channels preferably are comparatively shallow so that the outer edge portions of the tape project outwardly beyond the edge of the guide 40 where they may be engaged by the feeding device 41.

As illustrated in the drawings, the guide 40 may be made of two elongated inner plates 50 (see Figs. 15 through 19) disposed face to face generally in the plane of the bag 21 at the station 24 and of two similar outer plates 51 parallel to and spaced from the inner plates on opposite sides thereof. The plates are held apart by elongated spacer bars 52 which are narrower than the plates so that one inner plate 50 and the opposed outer plate 51 together with the intermediate spacer bar 52 cooperate to define one of the channels 48. The spacer bars terminate at a point spaced above the bag 21 and from this point downwardly the inner plates 50 diverge and then extend downwardly below the upper edge of the bag as indicated at 50'. The outer plates similarly diverge as shown at 51' and thus the channels 48 separate at 48' and straddle the upper bag margin. In order to facilitate entry of the bag into the space 53 between the end portions of the inner plates, the forward corners 50" (Fig. 19) at the lower ends of these plates are bent back as are the corresponding corners 51" of the outer plates.

Figure 9:
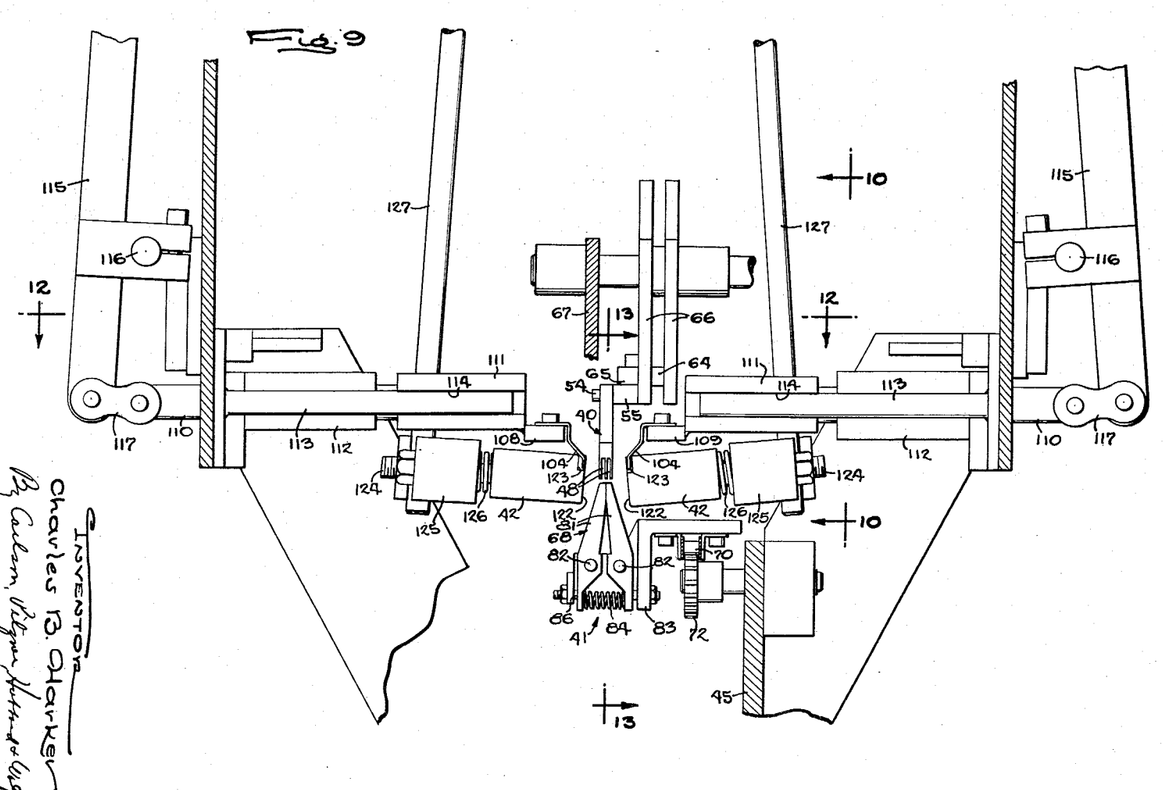
Fig. 9 is an enlarged fragmentary sectional view taken along the line 9—9 in Fig. 1.
Figures 10, 11:
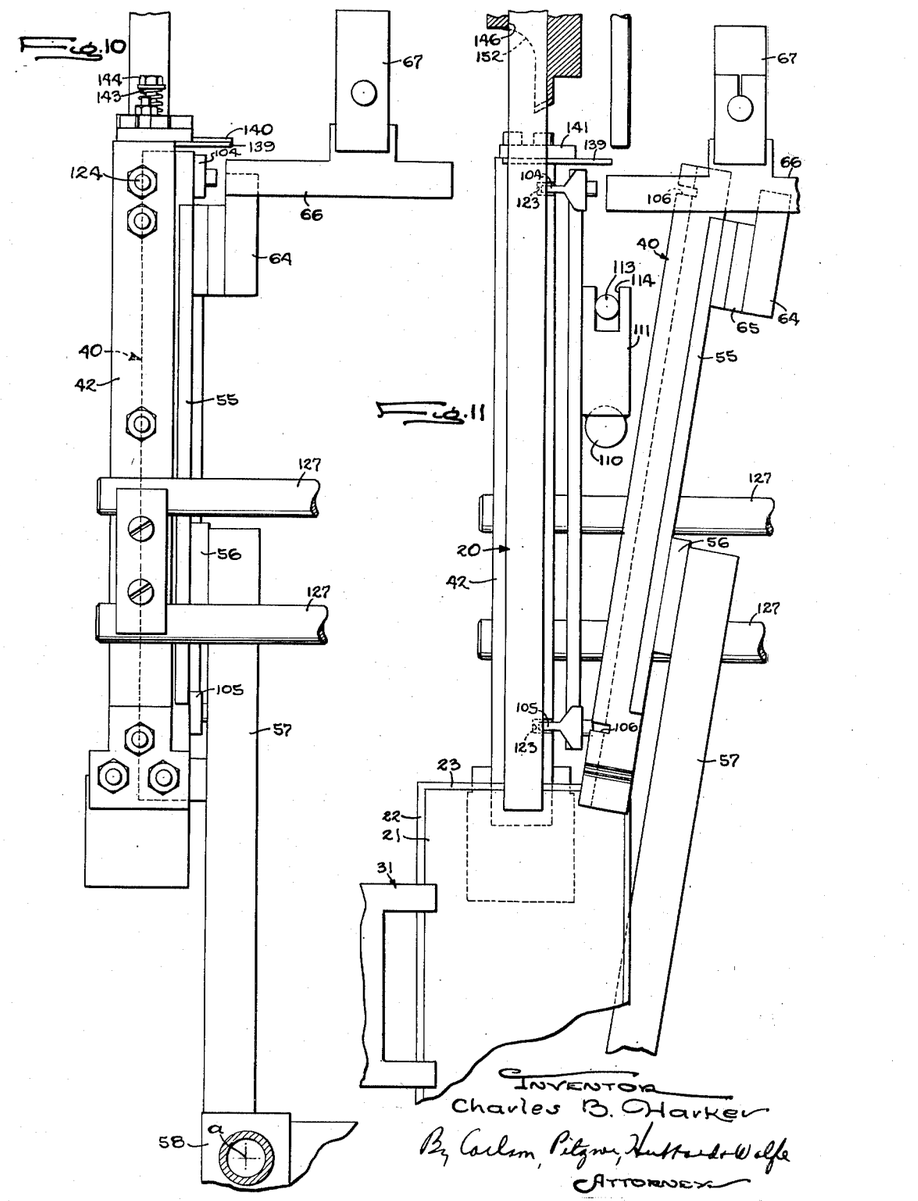
Fig. 10 is a fragmentary sectional view taken along the line 10—10 in Fig. 9.
Fig. 11 is a view similar to Fig. 10 but shows the parts in a different position.

The four guide plates 50 and 51 and the spacer bar 52 are fastened together by screws 54 (Figs. 9, 12 and 15) which are spaced along the forward edge of the guide 40 and are threaded into an elongated upright mounting bar 55 (Figs. 10 and 11) disposed against one of the outer plates 51. The mounting bar supports the guide for edgewise shifting to expose the tapes preparatory to sealing and, in this instance, such shifting is obtained by pivotally supporting the mounting bar on the casing 45 to turn about an axis $a$ disposed adjacent and extending transversely of the path of the bags 21. In this way, the guide swings laterally back and forth between an upright active position over the bag at the station 24 (Fig. 15) and an inactive position to one side of the tapes 39 (Fig. 11).

To support the guide 40 for swinging about the axis $a$, a block 56 is welded to the supporting bar 55 and to the upper end of the upright arm 57 of a bell crank lever 58. The latter is journaled intermediate its ends on a shaft 58 which is disposed below the lower end of the guide and defines the axis $a$. The lever 58 is swung in the proper timed relation with the other mechanisms, that is, while the bag 21 is dwelling at the station 24 and after the tapes 39 have been advanced to the position in which they are sealed, by a cam 59 on the camshaft 30. The cam 59 engages a follower 60 carried by the free end of a lever 61 fulcrumed on the frame 29 and operates to rock the lever 58 through the medium of a link 62 swiveled at one end to the lever 61 and at the other end to the rearwardly projecting arm 63 of the bell crank lever. At its upper end, the guide 40 is supported laterally by a finger 64 (Figs. 9, 10 and 11) which is welded to a block 65 fast on the mounting bar 55 and which slides between spaced horizontal rails 66. The latter are supported in spaced parallel relation by a bracket 67 suitably secured to the casing 45 and hold the finger 64 and hence the guide upright during swinging between the active and inactive positions.

In order to advance the tapes 39 through the guide 40, the feeding device 41 comprises a clamp 68 (Fig. 13) which grips the exposed edges of the tapes and travels down alongside the channeled edge of the guide. Preferably, a second clamp 69 trailing behind the first clamp also is employed. With this arrangement, the first clamp grips the tapes near the lower ends thereof and pulls the tapes down until the tape ends reach the flared lower portion of the guide. At this time, the first clamp releases the tapes and the downward advance of the latter is continued by the second clamp which feeds the ends of the tape down into the diverging parts 48' of the channels 48 and into straddling relation with the upper margin of the bag.

In the present instance, both clamps 68 and 69 are mounted on an endless chain 70 (Figs. 6, 9 and 13) which is disposed in a vertical plane with one run 70' extending alongside and parallel to the channeled edge of the guide 40. The upper portion of the chain is guided along the peripheral edges of a flat vertical plate 71 having a rounded upper edge above the top of the tape guide and mounted rigidly on the casing 45. At its lower end, the chain leaves the plate and passes around idler and driven sprocket wheels 72 and 73 which are disposed above the bag 21. The sprocket wheel 73 is driven from a sprocket wheel 74 (Fig. 1) on the end of the camshaft 30 through a chain 75, a sprocket wheel 76 (Figs. 6 and 13), a speed reducer 77 and spur gears 78 and 79, the latter gear being fast on a shaft 80 which is journaled in the casing 45 and supports the driven sprocket wheel 73. The chain 70 is driven continuously and its length is correlated with the advance of the bags and the operation of the various other mechanisms so that the chain makes one complete circle during each cycle of the machine.

Each clamp 68 and 69 grips the tapes 39 at a point just above the guide 40 and then, after pulling the tapes through the guide as it travels along the run 70', it releases the tape at a point above the flared lower portion of the guide, that is, just before it travels around the idler sprocket wheel 72. For this purpose, each clamp is composed of two opposed jaws 81 (Figs. 9 and 14) which are pivotally mounted intermediate their ends, as indicated at 82, on a bracket 83 secured to a link of the chain 70. The jaws are urged together by a compression spring 84 acting between the portions 85 of the jaws behind the pivots 82 and the pressure with which the jaws engage the tapes 39 when closed is regulated by adjustable stops 86 threaded through the bracket 83 and engaging the jaw end portions 85.

The jaws 81 of each clamp are opened and then closed to grip the tapes 39 by a cam 87 (Figs. 13 and 14) which spreads the jaws apart as the clamp approaches the run 70' and permits the spring 84 to close the jaws as the clamp enters the run. Herein, the cam 87 is a stationary arcuate bar suspended from a crossbar 88 rigid with the casing 45 and disposed alongside the forward portion of the upper curved edge of the plate 71 in the path of the clamps 68 and 69 to wedge in between the jaws 81 of each clamp. At its upper end, the cam is reduced in cross section to enter between the jaws and, below this end, it is widened to spread the jaws apart as the clamp approaches the run 70'. When the jaws reach the lower end of the cam, they are on opposite sides of the tapes 39 and, as the clamp passes out of engagement with the cam, the jaws are snapped together under the action of the spring 84 to grip and advance the tapes. At the lower end of the run 70', the jaws engage and are separated by a second and similar stationary cam 89 which is mounted on another crossbar 90 on the casing 45. By spreading the jaws 81 apart, the cam 89 releases each clamp from the tapes just before the clamp passes around the idler sprocket wheel 72.

In order that the tapes 39 may be drawn easily through the guide 40 by the clamps 68 and 69 without being torn, a separate feed mechanism unwinds the tapes from the supply rolls 43 and prevents the portions of the tape advanced by the clamps from being placed under tension. Herein, this separate feed mechanism includes the rollers 46 and 47 (Fig. 6) over which the tapes pass after leaving the supply rolls and these rollers are power driven to unwind the tapes. The rollers 46 and 47 are journaled respectively on brackets 91 and 92 upstanding from the top of the casing 45 and are driven in synchronism with the advance of the clamps 68 and 69 by a pulley 93 which is fast on the shaft 80 supporting the sprocket wheel 73. A toothed belt 94 extends around the pulley and is twisted through a right angle to pass around a pulley 95 fast on a shaft 96 which is journaled on the bracket 92. A spur gear 97 on the shaft 96 meshes with a gear 98 rigid with the roller 47 to turn the latter. A second toothed belt 99 passes around a sprocket 100 on the shaft 96 and around a sprocket 101 which is rigid with the roller 46 so that this roller is driven from the pulley 93 through the belt 94 and the belt 99. Weighted rollers 102 mounted on the ends of arms 103, which are pivotally mounted on the casing 45, hold the tapes in frictional engagement with the rollers 46 and 47 and insure that the tapes are unwound as the rollers turn.

After the tapes 39 have been advanced by the clamps 68 and 69, the guide 40 is swung back preparatory to sealing. To hold the tapes in place during such swinging, small grippers 104 and 105 (Figs. 7, 9 and 11) engage the tapes before the guide swings back and holds them until they have been sealed together and to the bag 21. The grippers 104 are disposed on opposite sides of the guide 40 adjacent the upper end of the latter while the grippers 105 are similarly located near the lower end of the guide. During the time the tapes are being advanced through the guide, the grippers are outside of the outer plates 51 of the guide. After the tapes have been advanced to the sealing position, the grippers move in together passing through notches 106 (Figs. 11 and 15) in the rear edges of the guide plates 50 and 51 and engaging the tapes.

Herein, each gripper is in the form of a small strip of sheet metal extending forwardly with its end portion 107 (Fig. 18) offset inwardly and constituting the jaw engaging the tapes. At their rear ends, the grippers are bolted to spaced vertical bars 108 and 109 (Fig. 7) disposed on opposite sides of the tapes, one gripper 104 and one gripper 105 being secured to the bar 108 while the other two grippers are on the bar 109. The bars are shifted together and apart to move the grippers into and out of engagement with the tapes and, for this purpose, rods 110 (Figs. 7 and 12) rigidly attached to the bars 108 and 109 through the medium of blocks 111 and projecting laterally outwardly from the sides of the bars slide in tubular guides 112 which are mounted on the sides of the casing 45. The tubular guides together with round bars 113 rigid with the casing and sliding in upwardly opening slots 114 in the blocks 111 cause the rods 110 and hence the grippers to move in and out along a straight line. Horizontal levers 115 are fulcrumed intermediate their ends on the casing at 116 and their forward ends are pivotally connected to the outer ends of the rods 110 through the medium of links 117.

To slide the rods 110 in and out, the levers 115 are rocked about their fulcrums 116 by cams 118 (Fig. 1) on the camshaft 30. For this purpose, the levers extend rearwardly beyond the casing and each is pivotally connected through the medium of a link 119 (Fig. 7) to an upright lever 120. The latter is fulcrumed intermediate its ends on the frame 29 and carries at its lower end a follower 121 riding on one of the cams 118. The latter are shaped to rock the upright levers 120 back after the tapes 39 have been advanced by the clamps 68 and 69. Such rocking turns the horizontal levers 115 to slide the rods 110 together and move the grippers 104 and 105 into engagement with the tapes. Upon completion of the sealing operation, the cams 118 swing the levers 120 in the opposite direction to release the tapes.

With the guide 40 swung back to expose the tapes 39 and with the tapes held by the grippers 104 and 105, the sealing elements 42 move together engaging selected areas of the tapes joining these areas together and to the bag 21. In the present instance, the sealing elements are elongated vertical shoes disposed on opposite sides of the guide and having opposed sealing surfaces 122 (Fig. 9). The latter are heated above the fusing temperature of the heat sealable material on the tapes and extend from the top to the bottom of the guide to overlap the upper margin of the bag. Small notches 123 are cut in the surfaces 122 in alinement with the grippers so that the shoes may move into full engagement with the tapes while the grippers are holding the tapes.

Bolts 124 (Figs. 9 and 12) threaded into the outer sides of the shoes 42 slidably project through upright bars 125 and compression springs 126 encircling the bolts between each shoe and the corresponding bar resiliently support the shoes for yieldable engagement with the tapes 39. The bars are secured to the forward ends of horizontal levers 127 (Fig. 7) which are disposed within and fulcrumed intermediate their ends on the casing 45 at 128. As in the case of the levers 115, the levers 127 are swung together and apart to move the shoes into and out of engagement with the tapes. This is achieved by flexing toggle links 129 which are pivotally connected together and to the rear ends of the levers. The pivot 130 of the toggle is joined by means of a swivel joint to a link 131 which is swiveled at the other end on the upper end of the upright arm 132 (Fig. 1) of a bell crank lever 133. The latter is fulcrumed on the frame 29 and is rocked to flex the toggle by a cam 134 fast on the shaft 30. The cam acts on a follower 135 which is carried by the free end of a lever 136 fulcrumed on the frame 29 and connected to the horizontal arm 137 of the bell crank lever through a vertical link 138 swiveled at opposite ends to the lever 136 and the arm 137. The shape of the cam 134 is such as to swing the shoes 42 in and then out while the guide 40 is in the inactive position.

When the tapes 39 are sealed together and to the bag 21, they are cut at the top of the seal joining the tapes, that is, along a line adjacent the tops of the shoes 42, to separate the handle 30 from the supply rolls 43. For this purpose, two knife blades 139 and 140 (Fig. 12) horizontally disposed on opposite sides of the tapes and in the plane of the line of cutoff move together and shear the tapes along this line. Conveniently, the blades may be carried respectively by the bars 125 which support the sealing shoes 42 so that the tapes are sealed and cut simultaneously. Herein, the knife blade 139 is secured to a horizontal plate 141 rigidly attached to and projecting inwardly from the top of one of the bars 125. The blade 140 is disposed above the blade 139 and is mounted on a block 142 which is fastened to the top of the other bar. A spring 143 acting between the head of a bolt 144 threaded into the block and the blade 140 yieldably urges the latter down into shearing engagement with the block 139.

To insure that the ends of the tapes 39 resulting from the cutting by the knife blades 139 and 140 enter properly into the guide 40, means are provided to guide these ends respectively into the channels 48 in the guide. Preferably, this means comprises a second guide 145 (Figs. 8, 11, 13 and 15) disposed above the first and mounted to move up and down into and out of abutting engagement with the top of the guide 40. The upper guide 134 is formed with channels or guideways 146 (Fig. 16) which are alined with the channels 48 and through which the tapes 39 are threaded. The guide 145 is moved up before the tapes are cut to provide clearance for the knife blades and then, after the cutting operation, it moves back down on top of the guide 40. This downward movement separates the tape ends and causes them to pass on opposite sides of the center plates 50 of the guide 40 and thus enter their respective channels 48.

Figures 15, 16, 17, 18, 19:
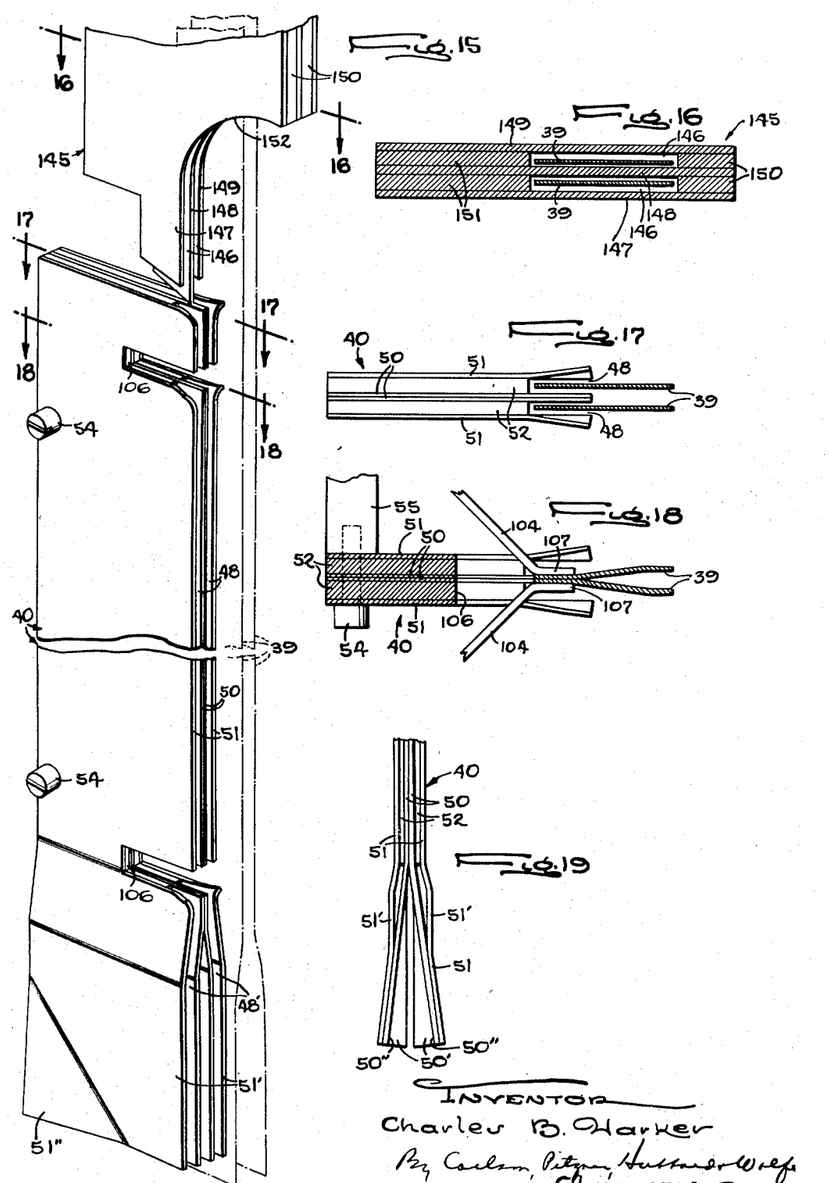
Fig. 15 is an enlarged fragmentary perspective view of the means for guiding the strips.
Figs. 16, 17 and 18 are sectional views taken respectively along the lines 16—16, 17—17 and 18—18 in Fig. 15.
Fig. 19 is a fragmentary end view of the means for guiding the strips.

In the present instance, the upper guide 145 is made from three flat parallel plates 147, 148 and 149 vertically disposed and spaced apart to form the channels 146. The plates are held in spaced relation by spacers 150 and 151 inserted between each pair of adjacent plates and extending along opposite edge portions of the plates. The latter extend beyond the channeled edge of the lower guide 40 so that the tapes are enclosed at both edges by the upper guide and thus are prevented from slipping out of this guide. The lower forward edge portion of the upper guide is cut away as indicated at 152 (Figs. 13 and 15) to expose the ends of the tape and permit these ends to be engaged by the travelling clamps 68 and 69. As shown in Fig. 15, the center plate 148 of the guide 145 extends down beyond the lower edges of the plates 147 and 149 so that, in the lower position of the guide 145, this plate abuts against the center plates 50 of the guide 40. Thus, as the guide 145 is lowered, the center plate 148 separates the severed ends of the tapes and forms, in effect, a continuation of the center plates 50. As a result, the tapes are forced to enter the proper channels 48 in the guide 40.

Figure 8:
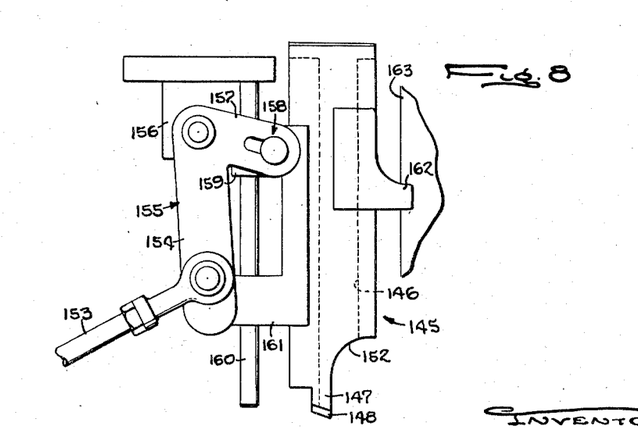
Fig. 8 is an enlarged fragmentary side view of one of the mechanisms for guiding the strips.
Figures 13, 14:
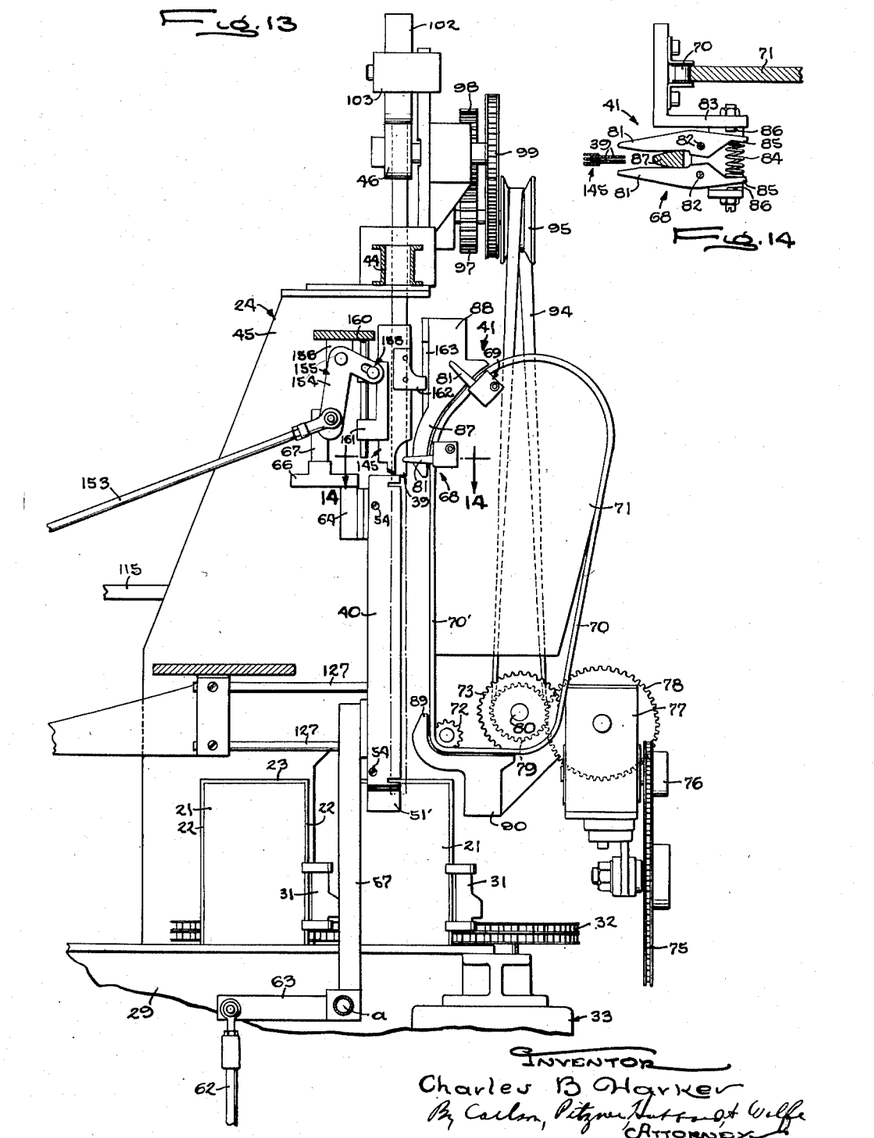
Fig. 13 is a fragmentary sectional view on a reduced scale taken along the line 13—13 in Fig. 9.
Fig. 14 is an enlarged fragmentary sectional view taken along the line 14—14 in Fig. 13.

Vertical endwise shifting of the upper guide 145 in timed relation to operation of the cutoff knife blades 139 and 140 and the advance of the tapes 39 is obtained by moving the guide through a linkage which is connected to the cam 134 on the camshaft 30. This linkage comprises the follower 135, the link 138, the bell crank lever 133 and a link 153 pivotally connected at one end to the upper end of the bell crank lever arm 132 and at the other end to one arm 154 of another bell crank lever 155 (Figs. 8 and 13). The latter is disposed immediately behind the upper guide and is fulcrumed on a bar 156 rigid with the casing 45. The other arm 157 of the lever 155 is pivotally connected by means of a pin and slot connection 158 to a boss 159 on the back of the guide 145. Thus, the bell crank lever 155 is rocked by the cam 134 through the follower 135, the lever 133 and the link 153 and such rocking moves the guide 145 up and down. A vertical rod 160 depending from the bar 156 slidably projects through the boss 159 and another boss 161 on the back of the guide to cause the latter to move along a straight line. The guide is held against turning about the rod 160 by fingers 162 secured to opposite sides of the guide and projecting forwardly therefrom to straddle a plate 163 depending from the stationary bar 88.

*Operation*

Each bag 21 gripped by one of the clamps 31 is presented to the filling station 25 and, while the bag is dwelling at this station, the cam 34 closes the switch 35 which energizes the dispenser 26 to deposit a quantity of material in the bag. The latter then is advanced step by step by the chain 32 to the station 27 where the cams 38 cause the shoes 28 to swing together and form the seal 23 closing the top of the bag. Next, the bag is advanced to the station 24 where the handle 20 is added.

As the bag enters the station 24, the lower guide 40 is upright in its active position, the sealing shoes 42 and the grippers 104 and 105 are swung back away from the tapes 39 and the upper guide 145 is in its lower position abutting against the top of the guide 40. At this time, the clamps 68 and 69 are travelling along the run 70' and are gripping the exposed edges of the tapes 39 to pull the latter down through the guide 40. As the leading clamp 68 approaches the flared lower portion of the guide 40, the jaws 81 of this clamp pass on opposite sides of the cam 89 and are spread apart to release the tapes as the clamp travels around the idler sprocket wheel 72. The trailing clamp 69 continues the downward advance of the tapes and pushes the ends of the latter down into the diverging portions 48' of the channels 48 so that these ends straddle the bag at the station 24. When the tapes have been advanced far enough to straddle the bag, the jaws of the clamp 69 pass on opposite sides of the cam 89 and are opened to release the tapes which thus dwell in position for sealing.

After the tapes 39 have been advanced and with the bag 21 at the station 24, the cams 118 shift the followers 121 to rock the levers 120 back. This swings the levers 115 causing the rods 110 to slide in and move the grippers 104 and 105 in through the slots 106 in the guide 40 and into engagement with the tapes. Next, the cam 59 permits the follower 60 to fall and this rocks the bell crank lever 58 to swing the guide 40 back to its inactive position and expose the portions of the tapes between the sealing shoes 42.

With the tapes 39 exposed, the cam 134 raises the follower 135 to swing the bell crank lever 137 forward. Through the medium of the link 153, such swinging rocks the bell crank lever 155 counterclockwise as viewed in Fig. 13 and raises the upper guide 145 to provide clearance for the knife blades 139 and 140. At the same time, the bell crank lever 133 straightens the toggle 129 swinging the bars 125 in together. The bars carry the heated sealing shoes 42 into engagement with the tapes so that the lower end portions of the tapes are sealed to the upper margin of the bag while, above the bag, the tapes are sealed together except for the small areas engaged by the grippers 104 and 105. Simultaneously, the knives 139 and 140 are swung together on the bars 125 and cut the tapes above the sealing shoes. The cams 118 then cause the grippers 104 and 105 to slide back and the completed bag with the handle 20 attached is removed from the machine.

Immediately before the bag is removed, the cam 134 swings the shoes 42 and the knives 139 and 140 back and the cam 59 rocks the lower guide 40 up to its active position. The cam 134 also lowers the upper guide 145 down on top of the guide 40 and such lowering separates the ends of the tapes for entry into the channels 48 of the lower guide. With the parts in this position, the jaws 81 of the clamp 68, which has been moving continuously along the path of the chain 70, pass on opposite sides of the cam 87 and are spread apart. While thus spread, the jaws enter the run 70' projecting into the cut-out portion 152 of the upper guide 145 and passing on opposite sides of the tapes. The cam then releases the jaws so that the clamp grips the tapes and begins to advance the latter down through the guide 40. Immediately following this, the second clamp 69 similarly is opened and grips the tapes above the first clamp. The two clamps then advance the tapes down into position to be sealed to the next bag.

I claim as my invention:

1. Mechanism for adding a handle to a bag comprising a hollow member defining an elongated guideway opening through one side of the member, means for supporting a bag at one end of said guideway, feeding mechanism for advancing two flexible strips in face to face relation along said guideway and toward the bag to a position in which the ends of the strips straddle an edge portion of the bag, means operable when said strips are in said position to shift said member laterally to an inactive position alongside the strips, a clamp engageable with said strips and operable to grip and hold the strips in said predetermined position during shifting of said member, sealing elements disposed on opposite sides of said member and having opposed elongated surfaces facing said strips and overlapping said bag edge portion, and means operable upon shifting of said member to move said elements into engagement with the strips to seal the same together and to said bag edge portion, said elements having recesses formed in said surfaces in alinement with said clamp to receive the clamp and permit full engagement of said surfaces with the strips.

2. Strip converting mechanism comprising a hollow member defining an elongated guideway opening through one side of the member, feeding mechanism for advancing two flexible strips in face to face relation along said guideway to a predetermined position, mechanism operable to shift said member laterally to an inactive position alongside said strips, gripping mechanism including a clamp engageable with said strips and operable to hold the strips in said predetermined position during shifting of said member, sealing elements disposed on opposite sides of said member, mechanism for moving said elements toward each other and into engagement with said strips to join selected areas of the strips together, and a timing device connected to said mechanisms successively to advance the strips to said predetermined position, grip the strips, shift said member to said inactive position and move said sealing elements into engagement with the strips.

3. Strip converting mechanism comprising a hollow member defining an elongated guideway opening through one side of the member, mechanism for advancing two flexible strips in face to face relation along said guideway to a predetermined position, mechanism operable when said strips are in said position to shift said member laterally to an inactive position alongside said strips, a clamp engageable with said strips and operable to grip and hold the strips in said predetermined position during shifting of said member, and means operable after shifting of said member and while the strips are gripped by said clamp to engage the strips and join selected positions of the same together.

4. Strip converting mechanism having, in combination, a hollow member defining an elongated guideway opening through one side of the member, means for guiding two flexible strips into said guideway in face to face relation with one edge of each strip projecting beyond said one side of said member, a gripper mounted to move along said member on the outside thereof and operable to engage the exposed portions of said strips and advance the same along said guideway to a predetermined position and then to release the strips, mechanism operable when said strips are in said position to shift said member laterally to an inactive position alongside the strips, a clamp engageable with said strips after release by said gripper and before shifting of said member to hold the strips in said predetermined position as said member is shifted, and means operable when said member is in said inactive position to engage said strips and join selected areas of the strips together.

5. In a strip converting mechanism, the combination of, means for supporting two strips of flexible material and for guiding the same into face to face relation for endwise advance along a predetermined path, an endless carrier having a run alongside said path, a gripper mounted on said carrier for bodily movement therewith and having opposed relatively movable jaws projecting into said path when the gripper is moving along said run, means yieldably urging said jaws together, a first cam stationarily mounted adjacent the beginning of said wedge to be straddled by said jaws apart and cause the jaws to pass on opposite sides of said strips and then to release the jaws whereby the jaws grip the strips and advance the same along said path, and a second and similar cam disposed along said run beyond said first cam and operable to spread said jaws thereby to release said strips after the strips have been advanced a predetermined distance.

6. Strip converting mechanism comprising means for supporting two strips of flexible material and for guiding the same into face to face relation for endwise advance along a predetermined path, an endless carrier having a run alongside said path, a gripper mounted on said carrier for bodily movement therewith and having opposed relatively movable jaws projecting into said path, an element to cause said jaws to move apart and pass on opposite sides of said strips as said gripper enters said run and then to move together and grip the strips thereby to advance the strips along said path, a second and similar element operable after the strips have been advanced a predetermined distance by said gripper to move said jaws apart and release the strips, a member operable to engage said strips and join selected areas of the strips together, a cutter operable to sever the joined areas from said strips, and mechanism for operating said member and said cutter after said gripper has released said strips.

7. In a strip converting mechanism, the combination of, means for supporting two strips of flexible material and for guiding the same into face to face relation for endwise advance along a predetermined path, an endless carrier having a run alongside said path, a gripper mounted on said carrier for bodily movement therewith and having opposed relatively movable jaws for gripping said strips, an element operable to cause said jaws to move apart as said gripper enters said run whereby the jaws pass on opposite sides of said strips and then to move together and grip the strips thereby to advance the strips along said path, and a second and similar element operable after the strips have been advanced a predetermined distance by said gripper to move said jaws apart and release the strips.

8. Strip converting mechanism comprising a hollow member defining an elongated guideway opening through one side of the member, means for guiding two flexible strips into said guideway in face to face relation with an edge of each strip exposed through said one side, a continuously moving carrier having an active run along said one side and an inactive run, a gripper mounted on said carrier and engaging exposed portions of the strips while moving along said active run to advance the strips through said guideway to a predetermined position, sealing elements disposed on opposite sides of said member and movable toward each other to engage and join selected areas of the strips, mechanism for shifting said member laterally out from between said sealing elements, and a timing device operable in synchronism with the advance of said carrier and effective when said gripper is on said inactive run to shift said member and move said sealing elements together.

9. Mechanism for adding a handle to a bag comprising a hollow member defining an elongated guideway opening through one side of the member, means for supporting a bag at one end of said guideway, means for guiding two strips of flexible material into said guideway at the other end of said member, a first gripper engaging said strips adjacent the ends thereof and movable along said member toward said bag to advance the strips along said guideway to a position short of the bag, said gripper releasing the strips when the latter are in said position, a second and similar gripper trailing said first gripper and operable after release of the strips by the first gripper to continue the advance of the strips to a second position in which the ends of the strips overlap an edge portion of the bag, and means operable when the strips are in said second position to engage the strips and join the two together and to said bag edge portion.

10. Strip converting mechanism comprising two elongated guide members spaced apart and defining between them a path for two strips of flexible material, means for guiding said strips into said path in face to face relation and with one edge portion of each strip projecting laterally beyond the adjacent edges of said plates, a gripper engaging the exposed edge portions of said strips, feed mechanism connected to said gripper and operable to move the gripper alongside said guide members thereby to advance the strips along said path to a predetermined position, means operable to shift said guide members laterally of said path and expose the full width of the strips when the latter are in said position, and sealing elements operable upon shifting of said guide members to engage the strips and join selected portions of the strips together.

11. Mechanism for adding a handle to a bag comprising a guide having two parallel and elongated recesses formed in one side of the guide and defining two paths, means for supporting a bag in a plane between said paths and adjacent one end of the guide, mechanism for guiding two flexible strips into said recesses at the other end of said guide with the strips in face to face relation and with one edge portion of each strip projecting beyond the recessed side of the guide, a gripper engaging the exposed edge portions of said strips and movable alongside said guide to advance the strips through said recesses to a position in which the ends of the strips straddle an edge portion of the bag, said gripper releasing the strips when the latter are in said position, mechanism operable to shift said guide laterally of the strips and expose the full width of the strips when the strips are in said position, and sealing elements operable upon shifting of said guide to engage said strips and to join the strips together and attach the ends of the strips to said bag edge portion.

12. Strip converting mechanism comprising two elongated plates spaced apart and defining between them a path for two strips of flexible material, means for guiding said strips into said path in face to face relation and with one edge portion of each strip projecting laterally beyond the adjacent edges of said plates, a feeding device engaging the exposed edge portions of said strips and operable to advance the strips along said path to a predetermined position, mechanism operable when said strips are in said position to shift said plates laterally of said path and to one side of said strips, and means operable upon shifting of said plates to engage the strips and join selected portions of the same together.

13. Mechanism for adding a handle to a bag comprising a hollow member defining two elongated passageways, an elongated guide abutting at one end against an end of said member and including three flat parallel plates spaced apart to define two paths forming continuations of said passageways, means for supporting a bag adjacent the other end of said guide and in the plane of the intermediate plate, a feeding device for advancing two flexible strips, one along each passageway and path, to a position in which the ends of the strips straddle an edge portion of the bag, sealing elements disposed on opposite sides of said guide and having opposed elongated sealing surfaces facing the portions of the strips in said paths and overlapping said bag edge portion, mechanism for shifting said guide laterally out from between said elements, means operable upon shifting of said guide to move said elements together to seal the strips together and to the bag, mechanism operable to shift said member endwise away from the bag, and a cutter operable to cut the strips transversely at a point exposed by shifting of said member.

14. Strip converting mechanism comprising a first hollow member defining an elongated guideway extending therethrough and opening laterally through one side of the member, a second hollow member normally abutting at one end against an end of said first member and having a passageway communicating with said guideway, means supporting said second member for endwise movement to a retracted position longitudinally spaced from said first member, means supporting said first member for shifting laterally to an inactive position out of alinement with said second member, a feeding device operable to advance two flexible strips together through said passageway and said guideway successively, mechanism operable after a predetermined advance of the strips to shift said first member to said inactive position and to move said second member to said retracted position, a sealing element disposed outside said first member and operable when the latter is in said inactive position to engage and join the strips together, and a cutter operable when said second member is in said retracted position to cut the strips adjacent said one end of said second member.

15. Strip converting mechanism comprising first and second hollow members disposed end to end and each defining an elongated guideway with the guideway in one member alined and communicating with the guideway in the other, a feeding device operable to advance two strips of flexible material successively through the guideway in said first member and the guideway in said second member to a predetermined position, the guideway in said second member opening laterally through one side of the member, mechanism for shifting said second member laterally to an inactive position to expose a portion of the strips and back into alinement with said first member, sealing means operable when said second member is in said inactive position to engage and seal together selected areas of the exposed strip portions, and a cutter operable after the strips are joined but before said second member is returned to its original position to sever the exposed portion of the strips from the portion of the strips remaining in the guideway of said first member.

16. Strip converting mechanism having, in combination, two elongated plates spaced apart and defining a path between them, mechanism for guiding two flexible strips into said path in face to face relation and advancing the strips intermittently along the path through steps of predetermined length, means supporting said plates for swinging edgewise to an inactive position alongside said path, sealing shoes disposed on opposite sides of said path outside said plates and mounted to move toward each other to engage the strips and seal selected areas of the strips together, and a timing device operable in synchronism with the advance of said strips to swing said plates out to the inactive position and back during dwelling of the strips and to move said shoes into and out of engagement with said strips while the plates are in said inactive position.

17. Mechanism for adding a handle to a bag comprising a hollow guide defining two spaced parallel paths disposed on opposite sides of a predetermined plane, means for supporting a bag adjacent one end of said guide, means for advancing two flexible strips, one along each of said paths, toward said end to a position in which the ends of the strips straddle an edge portion of the bag, mechanism operable when said strips are in said position to shift said guide laterally of said paths and to one side of said strips, and means operable upon shifting of said guide to engage said strips and to join the strips together and attach the ends of the strips to said bag edge portion.

18. Mechanism for adding a handle to a bag comprising means for supporting said bag in a predetermined position, a first elongated flat guide member projecting outwardly from one edge portion of the bag and disposed generally in the plane of the bag, second and third guide members paralleling and disposed on opposite sides of said first member to define two parallel paths, one on each side of said plane, sealing elements disposed on opposite sides of said plane outside of said members and having opposed elongated sealing surfaces facing said plane and overlapping said bag edge portion, means for advancing two flexible strips, one along each of said paths, to a position in which the ends of the strips straddle said edge portion, mechanism operable when the strips are in said position to shift said guide members laterally out from between said shoes, and means operable subsequent to shifting of said members to move said sealing elements together and bring said surfaces into engagement with said strips thereby to seal said strips to each other and to said edge portion.

19. Mechanism for adding a handle to a bag comprising a hollow guide defining two spaced parallel paths disposed on opposite sides of a predetermined plane, means for supporting a bag in said plane at one end of said guide, mechanism for advancing two flexible strips, one along each of said paths toward said end, to a position in which the ends of the strips straddle an edge portion of the bag, sealing elements disposed on opposite sides of said guide and mounted for movement toward and away from said plane, opposed surfaces on said elements facing said paths and overlapping said bag edge portion, mechanism operable when said strips are in said position to shift said guide laterally out from between said elements, and means operable upon shifting of said guide to move said sealing elements together and bring said surfaces into engagement with said strips thereby to seal said strips to each other and to said edge portion.

20. Mechanism for adding a handle to a bag comprising means for supporting the bag in a predetermined plane, two elongated plates spaced apart and defining between them a path disposed generally in said plane and extending outwardly from one edge portion of the bag, mechanism for guiding two strips of flexible material into said path in face to face relation and advancing the strips along the path and into a position in which the ends of the strip straddle said bag edge portion, sealing shoes disposed on opposite sides of said path outside said plates and mounted to move toward and away from each other, said shoes having elongated sealing surfaces facing said strips and overlapping said edge portion, means supporting said plates for movement laterally of said path and out from between said shoes, and a timing device operable first to shift said plates away from said path and then to move said shoes together into engagement with said strips thereby to seal the strips to each other and to said edge portion.

21. Strip converting mechanism comprising means for guiding two strips of flexible material each having a surface composed of heat sealable material into a predetermined path with the heat sealable surfaces of the strips disposed face to face, elongated plates normally disposed on opposite sides of said path to guide the strips along the path, mechanism advancing said strips intermittently along said path through selected distances, sealing shoes disposed on opposite sides of said path outside of said plates and having opposed heated surfaces, means supporting said plates for movement out from between said shoes and operable to move said plates out and back during dwelling of said strips, and mechanism operable in timed relation with movement of said plates to shift said shoes together when the plates are out from between the shoes and seal the strips together along the areas engaged by said heated surfaces.

22. Strip converting mechanism comprising a hollow guide defining an elongated passageway opening laterally through one side of the member, means for guiding a plurality of strips in face to face relation into one end of said passageway, mechanism engaging said strips and advancing the same endwise through said passageway to a predetermined position, sealing elements disposed on opposite sides of said guide and mounted to move toward and away from each other, mechanism operable when said strips are in said position to shift said guide laterally out from between said elements to expose said strips, and means operable after shifting of said guide to move said shoes together thereby to engage and join together selected areas of the strips.

No references cited.